(No Model.)

A. I. FARNAM.
FLY CATCHER FOR USE ON ANIMALS.

No. 532,454. Patented Jan. 15, 1895.

Witnesses
G. M. Lamasure
Chas. A. Muzzy

Inventor
A. I. Farnam
Alexander & Davis
his Attorneys

UNITED STATES PATENT OFFICE.

ARLINGTON INGALLS FARNAM, OF DUNHAM, CANADA.

FLY-CATCHER FOR USE ON ANIMALS.

SPECIFICATION forming part of Letters Patent No. 532,454, dated January 15, 1895.

Application filed September 4, 1894. Serial No. 522,121. (No model.)

*To all whom it may concern:*

Be it known that I, ARLINGTON INGALLS FARNAM, a subject of the Queen of Great Britain, residing at Dunham, in the county of Missisquoi and Province of Quebec, Canada, have invented certain new and useful Improvements in Fly-Catchers for Use on Animals, of which the following is a specification, reference being had therein to the accompanying drawings, in which—

Figure 1:
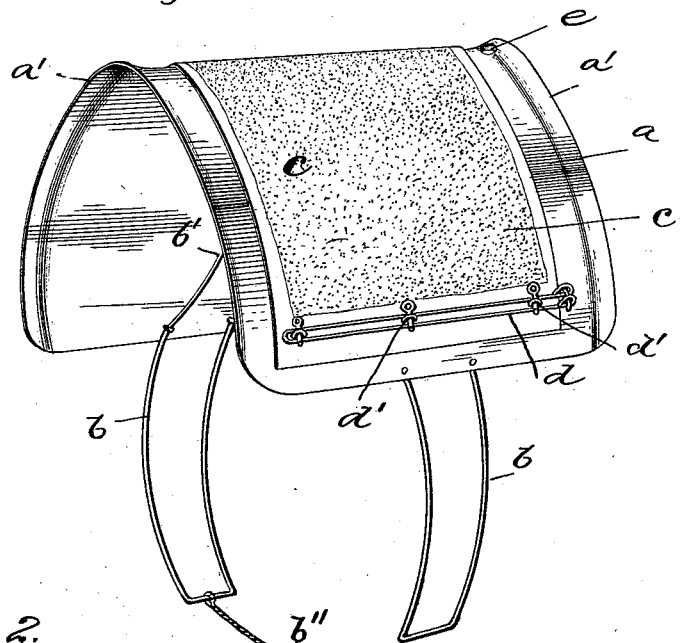
Figure 2:
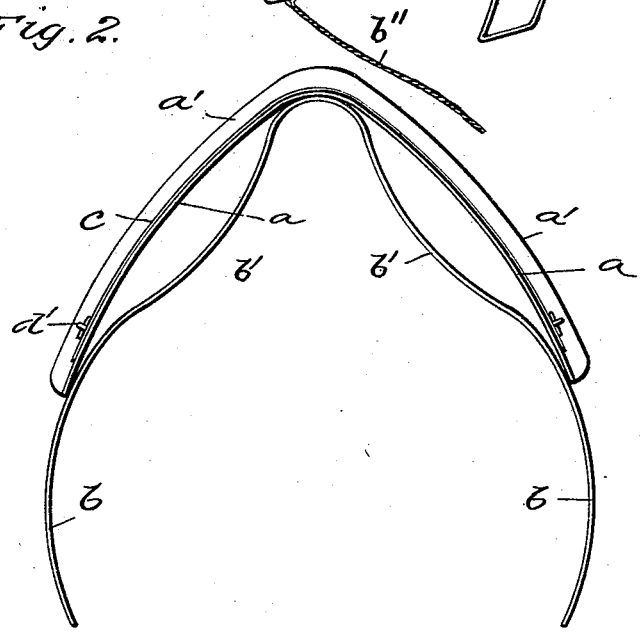

Figure 1 is a perspective view and Fig. 2 an end elevation of the preferred form of my device.

This invention is designed for removably holding sheets of fly paper upon the backs of cattle for the purpose of catching horn and other flies that bother the cattle.

The device is intended to be placed on the backs of several members of the herd when the same is brought into the yard in the evening and to be removed before being turned out to pasture the next morning. The fly paper used is of the sticky variety so that the insects will be caught and held and killed and thereby relieve the herd of much annoyance and permit the cattle to rest quietly.

In the drawings, $a$ is a saddle-shaped device of thin sheet metal or other flexible material, the front and rear edges thereof being slightly turned up at $a'$ to prevent galling. To the under side of the saddle a wire frame $b$ is soldered or otherwise secured. This frame conforms substantially to the shape of the saddle except that its sides $b'$ $b'$ are bulged inwardly near the upper part of the frame, these bulged portions being adapted to rest upon the back of the animal on each side of its backbone, without touching the same, whereby the saddle-shaped part may be prevented from slipping forward onto the animal's neck and also prevented from turning around or slipping down on the animal's sides. The two depending ends of the frame are curved to substantially fit the animal's sides in order to steady the device and for the reception of a securing strap or cord $b''$, which latter is adapted to be passed around under the animal in the manner of a belly-band. A sheet of paper or other flexible material $c$, covered with a suitable sticky composition, is placed upon the saddle and bent to conform to its shape, the ends of the sheet being removably secured by any suitable means, such, for instance, as by the swinging wire hasp $d$ and the staples and pins $d'$, the hasp $d$ being adapted to embrace the staples and the pins being adapted to pass down through the staples and keep the hasp pressed against the fly paper. It is evident that the paper sheet may be dispensed with and the sticky composition placed directly on the saddle or plate, if desired. A hole $e$ is formed at the rear edge of the saddle to enable a crupper to be attached if the same be found desirable.

This device is very simple in construction and has been found very effective in practice in relieving the herd from the annoyance of flies. As many of the devices may be used in a single herd as is found necessary, the number being determined by the size of the herd and the quantity of troublesome insects.

As is manifest, plates carrying a fly catching composition may be secured to the sides of the frame $b$, if found desirable.

Having thus fully described my invention, what I claim is—

1. The combination of a saddle-shaped plate carrying a sticky composition for catching flies, and means for removably attaching said plate to an animal's back, substantially as described.

2. The combination of a saddle-shaped plate carrying means for removably holding a sheet of fly-paper thereto and means for removably attaching said plate to an animal's back, substantially as described.

3. The combination of a saddle shaped plate carrying a fly-catching composition, and means secured to the under side of said plate for securing the same to an animal's back, said means consisting of a frame having its upper portion bent inwardly, at $b'$, and its ends extended downwardly, substantially as described.

4. In a fly catcher for animals the combination of a frame bent to approximately fit an animal's back and formed with inwardly curved ends adapted to embrace the animal's sides, and a plate or plates secured to said frame and provided with a sticky composition, substantially as described.

In testimony whereof I affix my signature in presence of two witnesses.

ARLINGTON INGALLS FARNAM.

Witnesses:
P. F. FERGUSON,
R. H. ARTHER.